(12) United States Patent
Sang et al.

(10) Patent No.: US 12,478,354 B2
(45) Date of Patent: Nov. 25, 2025

(54) 3D/4D CONTRAST-ENHANCED ULTRASOUND IMAGING APPARATUS, METHODS AND MEDIA

(71) Applicant: SHENZHEN MINDRAY BIO-MEDICAL ELECTRONICS CO., LTD., Guangdong (CN)

(72) Inventors: Maodong Sang, Shenzhen (CN); Lei Zhu, Shenzhen (CN); Xujin He, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 383 days.

(21) Appl. No.: 17/971,524

(22) Filed: Oct. 21, 2022

(65) Prior Publication Data
US 2023/0127709 A1    Apr. 27, 2023

(30) Foreign Application Priority Data

Oct. 26, 2021   (CN) .......................... 202111246292.6

(51) Int. Cl.
*A61B 8/00*        (2006.01)
(52) U.S. Cl.
CPC ............... *A61B 8/54* (2013.01); *A61B 8/469* (2013.01); *A61B 8/481* (2013.01); *A61B 8/483* (2013.01); *A61B 8/585* (2013.01)
(58) Field of Classification Search
None
See application file for complete search history.

(56) References Cited

U.S. PATENT DOCUMENTS

| | | | |
|---|---|---|---|
| 2005/0187475 A1* | 8/2005 | Nakaya | A61B 8/06 600/439 |
| 2008/0081998 A1* | 4/2008 | Pan | G01S 15/8993 600/458 |
| 2014/0071125 A1* | 3/2014 | Burlina | G06T 17/00 345/420 |
| 2017/0199651 A1* | 7/2017 | Pintoffl | G06F 3/04815 |
| 2020/0214676 A1* | 7/2020 | McLaughlin | G06T 5/50 |
| 2020/0281571 A1* | 9/2020 | Luo | A61B 8/461 |

* cited by examiner

*Primary Examiner* — Patricia J Park
(74) *Attorney, Agent, or Firm* — Sheppard Mullin Richter & Hampton LLP

(57) ABSTRACT

Disclosed are 3D/4D contrast-enhanced ultrasound imaging (CEUS) apparatus, 3D/4D CEUS imaging methods and media. The method comprises: receiving an input for selecting a 3D/4D contrast-enhanced imaging mode; receiving an input for setting an imaging velocity including a first imaging velocity and a higher second imaging velocity; controlling the apparatus with an imaging parameter associated with the selected imaging mode and the set imaging velocity to achieve imaging with the selected imaging mode in the set imaging velocity, wherein an association between the imaging parameter and the imaging velocity allows that an amount of data required to generate images per volume using the first imaging velocity is greater than that using the second imaging velocity. In this way, a desired imaging mode and imaging velocity can be chosen freely and an imaging parameter can be selected pointedly, meeting real-time observation needed by doctors with limited data processing capability and various probes.

18 Claims, 6 Drawing Sheets

3D/4D CONTRAST-ENHANCED ULTRASOUND IMAGING APPARATUS, METHODS AND MEDIA

CROSS REFERENCE TO RELATED APPLICATIONS

This application is based on and claims priority to and benefits of Chinese Patent Application No. 202111246292.3, filed on Oct. 26, 2021. The entire content of the above-identified application is incorporated herein by reference.

TECHNICAL FIELD

The present disclosure relates to medical imaging apparatus, methods and media, and more particularly, to contrast-enhanced ultrasound (CEUS) imaging apparatus, methods and media.

BACKGROUND OF THE INVENTION

Ultrasound contrast agents are generally encapsulated microbubble with micron diameter. The basic principle of CEUS imaging is to inject the ultrasound contrast agents into a human body, and use an ultrasound system to detect backward reflection signals from the contrast agents. The strong reflection of the ultrasound contrast agents to the incident sound waves greatly enhances the blood flow signals, so that tiny blood flow signals that could not be detected becomes detectable. CEUS imaging has played an increasingly important role in differential diagnosis and ablation evaluation of cardiovascular diseases, liver, thyroid and breast diseases in recent years.

CEUS imaging can obtain dynamically high contrast-enhanced images that describe blood perfusion of lesion and surrounding normal tissues. Taking liver tumors as an example, the micro-blood flow in malignant tumors is often richer than that in normal tissues, and its typical performance of CEUS is microbubbles quickly wash-in and wash-out rapidly from the lesion area on the contrast-enhanced image. Commonly used 2D real-time CEUS imaging frame rate currently is usually set to 10-15 fps. In 3D contrast-enhanced imaging, dynamic 2D contrast-enhanced data of a section of a human organ acquired continuously may be conducted with a series of processing, and arranged in a certain order to reconstitute 3D volume data on which 3D rendering (surface rendering, volume rendering, etc.) is performed to represent 3D information of contrast agents perfusion in tissues and organs so as to generate a volume of 3D contrast-enhanced images. Similarly, 4D contrast imaging can be considered as temporally continuous 3D contrast-enhanced imaging.

Under a commonly used 2D real-time CEUS imaging frame rate, the requirements of doctors for real-time observation cannot be met due to far lower imaging velocities of various probes of 3D CEUS or limited computing power of the system; in this connection, it is difficult to capture a complete perfusion process of microbubbles, leading to the inability of doctors to give reliable diagnosis results.

SUMMARY OF THE INVENTION

Therefore, there is a need for 3D/4D CEUS imaging apparatus, 3D/4D CEUS imaging methods and media, by means of which a desired contrast imaging mode and imaging velocity can be chosen freely and an imaging parameter can be selected pointedly, so that the requirements of doctors for real-time observation can be met where data processing may be limited and various probes may be adopted.

According to a first aspect of the present disclosure, a 3D/4D CEUS imaging apparatus is provided. It may include a planar array probe, a transmitting circuit configured to excite the planar array probe to transmit ultrasonic waves to a target, a receiving circuit configured to control the planar array probe to receive ultrasonic echo signals from the target, and a processor. The processor may be configured for: receiving an input for selecting a 3D contrast-enhanced imaging mode or a 4D contrast-enhanced imaging mode; receiving an input for setting an imaging velocity; and controlling the 3D/4D contrast-enhanced ultrasound imaging apparatus with an imaging parameter associated with the selected contrast-enhanced imaging mode and the set imaging velocity, so as to realize imaging at the set imaging velocity under the selected contrast-enhanced imaging mode. The imaging velocity may include a first imaging velocity and a second imaging velocity which is higher than the first imaging velocity. The imaging parameter may be associated with the imaging velocity in such a manner that the amount of data required to generate images per volume using the first imaging velocity is greater than the amount of data required to generate images per volume using the second imaging velocity, wherein the imaging parameter may include at least one of items required to generate one volume of data: a number of transmission, line density, a number of data per line, and a range of region of interest (ROI).

According to a second aspect of the present disclosure, a 3D/4D CEUS imaging apparatus is provided. It may include a probe, a transmitting circuit configured to excite the probe to transmit ultrasonic waves to a target, a receiving circuit configured to control the probe to receive ultrasonic echo signals from the target, and a processor. The processor may be configured for: receiving an input for selecting a 3D contrast-enhanced imaging mode or a 4D contrast-enhanced imaging mode; receiving an input for setting an imaging velocity; and controlling the 3D/4D contrast-enhanced ultrasound imaging apparatus with an imaging parameter associated with the selected contrast-enhanced imaging mode and the set imaging velocity, so as to realize imaging at the set imaging velocity under the selected contrast-enhanced imaging mode. The imaging parameter including at least one of items required to generate one volume of data: a number of transmission, line density, a number of data per line, pulsed repetition frequency, and a range of ROI.

According to a third aspect of the present disclosure, a 3D/4D CEUS imaging method is provided. It may be used in a 3D/4D contrast-enhanced ultrasound imaging apparatus comprising a planar array probe, a transmitting circuit configured to excite the planar array probe to transmit ultrasonic waves to a target, a receiving circuit configured to control the planar array probe to receive ultrasonic echo signals from the target, and a processor. The 3D/4D CEUS imaging method may include: by means of the processor, receiving an input for selecting a 3D contrast-enhanced imaging mode or a 4D contrast-enhanced imaging mode; receiving an input for setting an imaging velocity comprising a first imaging velocity and a second imaging velocity which is higher than the first imaging velocity; and controlling the 3D/4D contrast-enhanced ultrasound imaging apparatus with an imaging parameter associated with the selected contrast-enhanced imaging mode and the set imaging velocity so as to realize imaging at the set imaging velocity under the selected contrast-enhanced imaging mode. The imaging parameter may be associated with the imaging velocity in such a manner that the amount of data required to generate images per volume using the first imaging velocity is greater than the amount of data required to generate images per volume using the second imaging velocity, and the imaging parameter may include at least one of items required to generate one volume of data: a number of transmission, line density, a number of data per line, and a range of ROI.

According to a fourth aspect of the present disclosure, a 3D/4D CEUS imaging method is provided. It may be used in a 3D/4D contrast-enhanced ultrasound imaging apparatus comprising a probe, a transmitting circuit configured to excite the probe to transmit ultrasonic waves to a target, a receiving circuit configured to control the probe to receive ultrasonic echo signals from the target, and a processor. The 3D/4D CEUS imaging method may include: by means of the processor, receiving an input for selecting a 3D contrast-enhanced imaging mode or a 4D contrast-enhanced imaging mode; receiving an input for setting an imaging velocity; and controlling the 3D/4D contrast-enhanced ultrasound imaging apparatus with an imaging parameter associated with the selected contrast-enhanced imaging mode and the set imaging velocity so as to realize imaging at the set imaging velocity under the selected contrast-enhanced imaging mode. The imaging parameter may include at least one of items required to generate one volume of data: a number of transmission, line density, a number of data per line, pulsed repetition frequency, and a range of ROI.

According to a fifth aspect of the present disclosure, a computer-readable storage medium having stored thereon computer-executable instructions which, when executed by a processor, implement the 3D/4D CEUS imaging method according to respective embodiments of the present disclosure.

BRIEF DESCRIPTION OF THE DRAWINGS

The features, advantages, and technical and industrial implications of exemplary embodiments of the present disclosure will be described below with reference to the accompanying drawings. The same or similar reference numerals in the drawings generally refer to the same or similar components or steps, in which:

FIG. 7($b$) is a schematic configuration of imaging parameters used in a 3D/4D CEUS imaging method where a probe is a planar array probe according to an embodiment of the present disclosure;

FIG. 7($c$) is a schematic configuration of imaging parameters used in a 3D/4D CEUS imaging method where a probe is a linear array probe according to an embodiment of the present disclosure; and FIG. 7($d$) is a schematic configuration of imaging parameters used in a 3D/4D CEUS imaging method where a probe is a convex array probe according to an embodiment of the present disclosure.

DETAILED DESCRIPTION

Embodiments of the present disclosure will be described hereinafter; however, they are not intended to confine the present disclosure. All components of the embodiments are not always essential.

Figure 1:
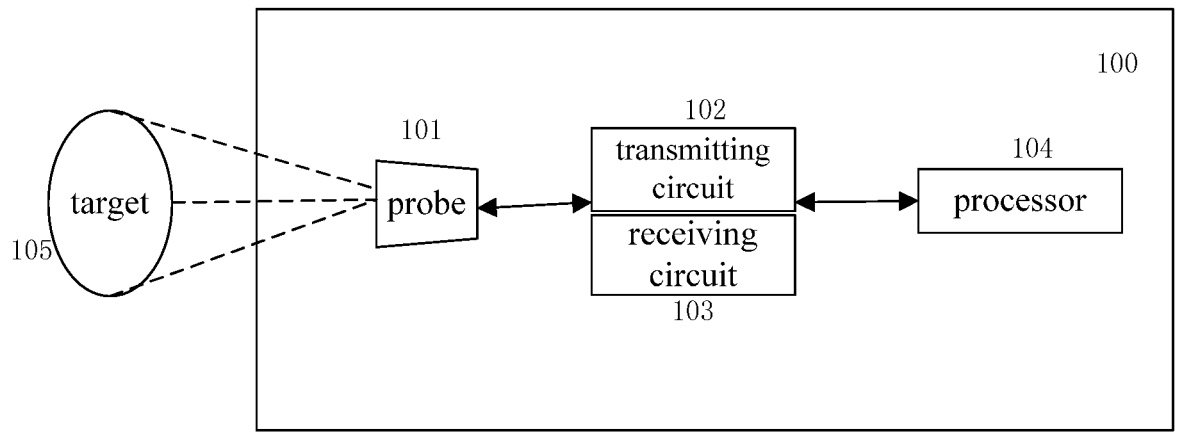
FIG. 1 is a schematic configuration of a 3D/4D CEUS imaging apparatus according to an embodiment of the present disclosure.

FIG. 1 schematically shows a configuration of a 3D/4D CEUS imaging apparatus according to an embodiment of the present disclosure. As shown in FIG. 1, the 3D/4D CEUS imaging apparatus 100 may include a probe 101, a transmitting circuit 102 for exciting the probe 101 to transmit ultrasonic waves to a target 105, a receiving circuit 103 for controlling the probe 101 to receive ultrasonic echo signals from the target 105, and a processor 104.

Various types of probes 101 may be employed, such as, but not limited to, at least one of an ultrasonic volume probe, a planar array probe, and a conventional ultrasonic array probe (such as a linear array probe, a convex array probe, etc.). Correspondingly, there are generally three scanning methods for acquisition of volume data in 3D/4D CEUS imaging apparatus: free arm scanning by the conventional ultrasonic array probe; swing or sliding scanning by the head of the ultrasonic volume probe driven by a motor; and electronic stereo scanning by the planar array probe. With the aid of electronic stereo scanning, the acquisition velocity of the planar array probe for 3D contrast enhancement may be significantly faster than that adopting in the first two methods, but it may lead to a large calculation load of 3D/4D CEUS imaging apparatus.

In some embodiments, the processor 104 may be a processing device that includes more than one general-purpose processing device, such as a microprocessor, a central processing unit (CPU), a graphics processing unit (GPU), or the like. More specifically, the processor may be a complex instruction set computing (CISC) microprocessor, a reduced instruction set computing (RISC) microprocessor, a very long instruction word (VLIW) microprocessor, a processor running other instruction sets or a combination of instruction sets. The processor may also be one or more special-purpose processing devices, including an application specific integrated circuit (ASIC), a field programmable gate array (FPGA), a digital signal processor (DSP), a system on a chip (SoC), or the like.

The processor 104 may be configured to execute the 3D/4D CEUS imaging methods according to various embodiments of the present disclosure.

Figure 2:
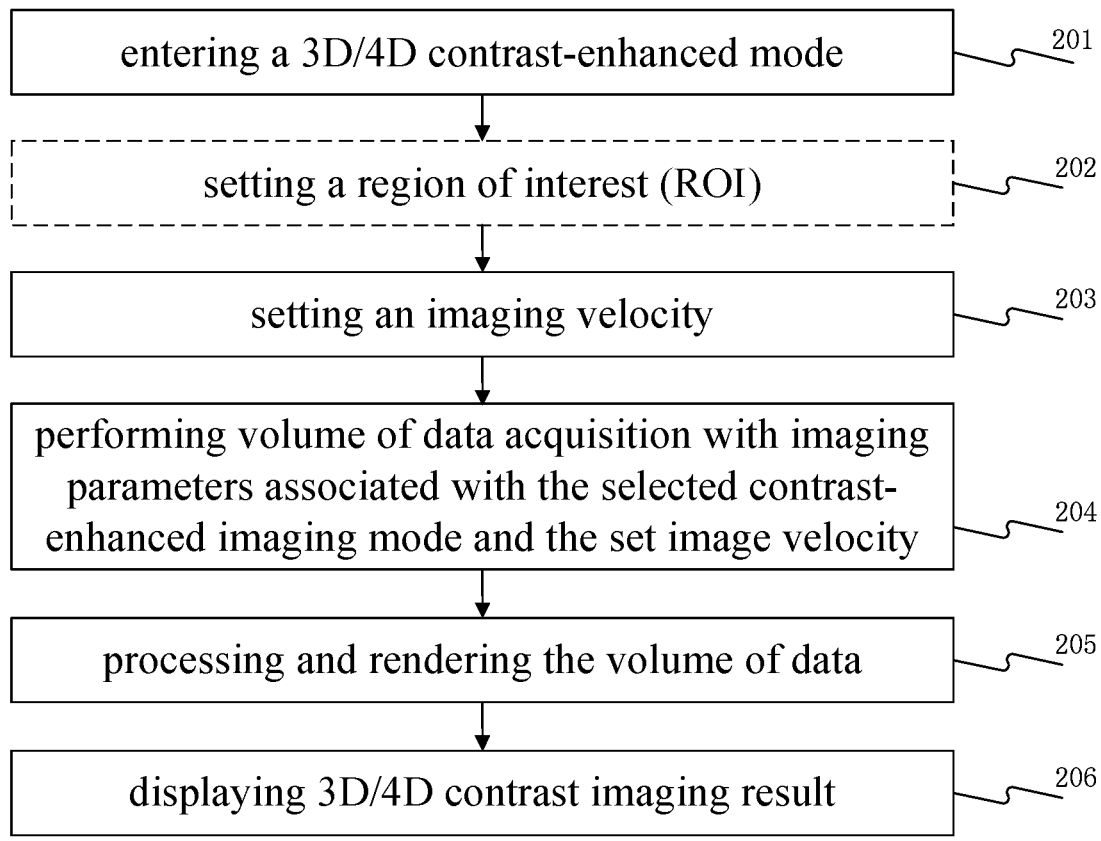
FIG. 2 is a schematic flowchart of a 3D/4D CEUS imaging method according to an embodiment of the present disclosure.

As shown in FIG. 2, in some embodiments, the 3D/4D CEUS imaging method may start from step 201 in which a 3D or 4D contrast-enhancing mode is entered through such as a device panel or a touch-screen button. In some embodiments, where the probe is an ultrasound volume probe or a planar array probe, a region of interest (ROI) may be set (step 202) so as to reduce the amount of data to be collected for imaging. In step 203, the imaging velocity may be set by the user. In some embodiments, the imaging velocity can be chosen by a user among multiple levels of imaging velocities, such as a conventional velocity and a high velocity. The high velocity is especially suitable for contrast examinations in small lesions having hypervascularity (which can be at several centimeter level or even smaller), making it possible to capture the complete perfusion process of microbubbles. In some embodiments, the value of the imaging velocity may also be set automatically by the user. In some embodiments, the application scenarios of CEUS can also be set by the user, such as but not limited to whether there is a small lesion with hypervascularity, cardiac blood supply, etc., and an adapted imaging velocity is automatically matched based on the set application scenarios. Next, with the imaging parameters associated with the selected contrast-enhanced imaging mode and the set imaging velocity, an appropriate amount of contrast agent microbubbles is injected into the human body to perform acquisition of volume data (step 204). Specifically, the 3D/4D CEUS imaging apparatus may be controlled by using the imaging parameters associated with the selected contrast-enhanced imaging mode and the set imaging velocity to achieve imaging under the selected contrast-enhanced imaging mode at the set imaging velocity. In step 205, the acquired volume data may be performed with a series of rearranging and rendering. Finally, a resulted 3D/4D contrast image can be demonstrated on a display (not shown).

Figure 3:
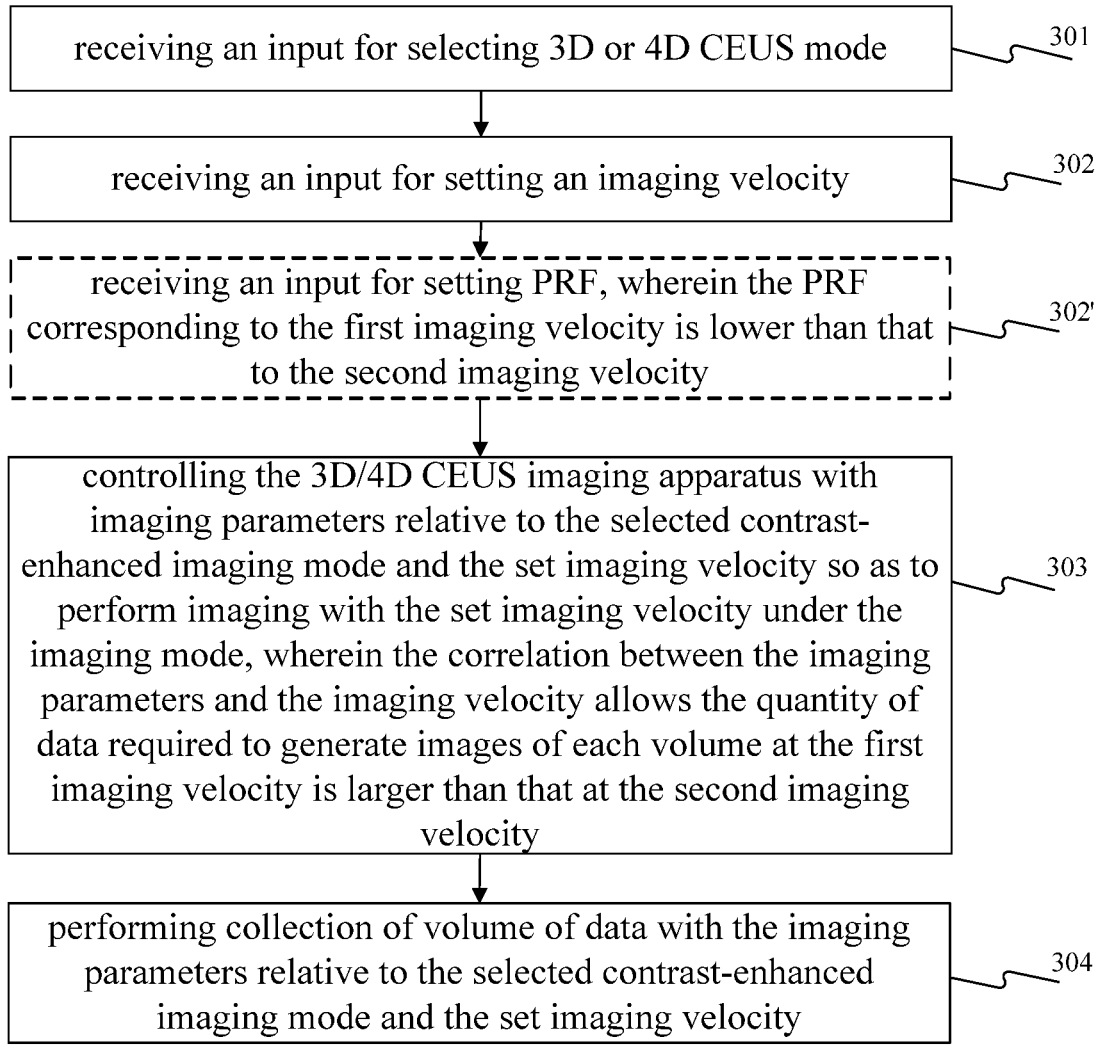
FIG. 3 is a schematic diagram for an Example 1 of a 3D/4D CEUS imaging method according to an embodiment of the present disclosure.

FIG. 3 schematically shows a diagram for an Example 1 of the 3D/4D CEUS imaging method according to an embodiment of the present disclosure. This Example 1 is applicable to a planar array probe, but only as an example.

The method may include a step 301 of receiving an input for selecting a 3D contrast-enhanced imaging mode or a 4D contrast-enhanced imaging mode. In step 302, an input for setting an imaging velocity may be received. The imaging velocity may include a plurality of different imaging velocities to meet the requirements of real-time observation. Specifically, it may include at least a first imaging velocity and a second imaging velocity higher than the first imaging velocity. In step 303, the 3D/4D CEUS imaging device may be controlled with imaging parameters associated with the selected contrast-enhanced imaging mode and the set imaging velocity to achieve imaging under the selected imaging mode at the set imaging velocity. Specifically, the association of the imaging parameters with the imaging velocity may allow the amount of data required to generate each volume of images under the first imaging velocity be greater than the amount of data required to generate each volume of images under the second imaging velocity, wherein the imaging parameters may include at least one of the following items that required to generate one volume of data: the number of transmission, line density, the number of data per line, and the range of ROI. That is to say, by adjusting at least one of the number of transmission, line density, the number of data per line, and the ROI range that are required to generate one volume of data under various imaging velocities, the amount of data required to generate each volume of images under the second imaging velocity is less than the amount of data required to generate each volume of images under the first imaging velocity; thereby solving the problem of limited data processing capability of CEUS imaging apparatus when applying a planar array probe. The second imaging velocity can be ensured to be faster than the first imaging velocity by reducing the amount of data to be processed.

In some embodiments, prior to controlling the 3D/4D CEUS imaging apparatus with imaging parameters associated with the selected contrast-enhanced imaging mode and the set imaging velocity (step 303), an input for setting a pulse repetition frequency (PRF) may be received, wherein the PRF corresponding to the first imaging velocity is lower than that corresponding to the second imaging velocity (step 302'). As a result, the amount of data required for each volume of images can be reduced, and further the imaging velocity may be improved by increasing the PRF.

In some embodiments, the planar array probe may transmit ultrasonic waves to the target under a same transmission mode when the imaging velocity is set as the first imaging velocity or the second imaging velocity. The electronic stereo scanning of the planar array probe makes the change of the transmission mode have limited effect on reducing the number of transmissions required to generate one volume of data; on the contrary, frequently switching the transmission mode may be costly, speeding up the damage of the planar array probe which is expensive. Specifically, when the imaging velocity is set as the first imaging velocity or the second imaging velocity, the planar array probe may freely use various transmission modes, including but not limited to a plane-wave transmission mode, a wide-beam transmission mode, a coherent-combination transmission mode and a focused-wave transmission mode.

Figure 4:
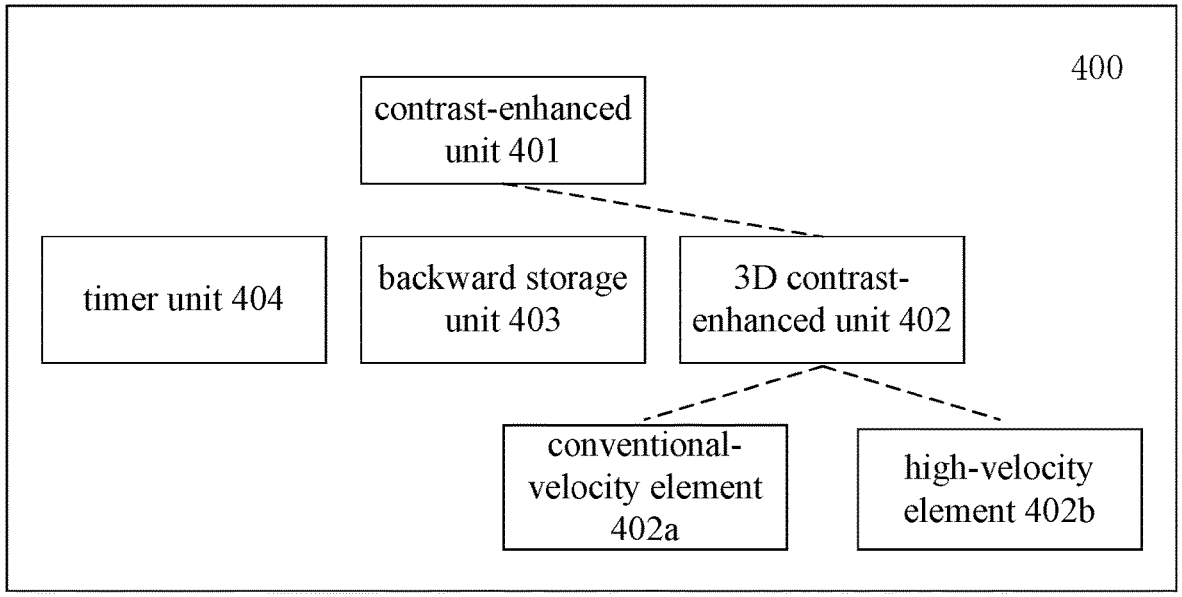
FIG. 4 is a schematic interface of a 3D/4D CEUS imaging apparatus under the 3D contrast-enhanced imaging mode according to an embodiment of the present disclosure.

FIG. 4 schematically shows an interface under a 3D contrast-enhanced imaging mode of a 3D/4D CEUS imaging apparatus according to an embodiment of the present disclosure. Under the 3D contrast-enhanced imaging mode which is also called a static 3D contrast-enhanced imaging mode, only one volume of 3D contrast-enhanced images may be acquired, processed, generated, displayed and stored each time. After the lesion to be observed is selected by the user, a first interface part 400 at least configured for the 3D contrast-enhanced mode is presented via a device panel or a touch screen button, and a first input configured for selecting the 3D contrast-enhanced mode is received in response to a first interactive operation by the user on the first interface part 400 (for example selecting the 3D contrast-enhanced unit 402 which belongs to a contrast-enhanced unit 401), thereby enabling the 3D contrast-enhanced mode of the apparatus. Correspondingly, a second interface part involving the first imaging velocity and the second imaging velocity (such as a conventional-velocity element 402a and a high-velocity element 402b shown in FIG. 4) and being in association with the 3D contrast-enhanced imaging mode may be presented in the first interface part 400. Next, a second input configured for selecting the first imaging velocity or the second imaging velocity may be received in response to a second interactive operation by a user on the second interface part, for example choosing the conventional-velocity element 402a or the high-velocity element 402b. It should be noted that under the 3D contrast-enhanced imaging mode, the "high velocity" and the "conventional velocity" are examples of the "second imaging velocity" and the "first imaging velocity" respectively in the present disclosure, but a plurality of different imaging velocities may also be set. After entering the 3D imaging mode, a choice of two velocities—the conventional velocity and the high velocity—may be offered by the system. The difference between these two velocities is that the latter will collect volume data within an identical range faster than the former. For example, when a volume probe scans at a conventional velocity, it may take 6 seconds from starting scanning to generate a volume of static 3D images, while at the high velocity it may only take 3 seconds from starting scanning to generate a volume of images. In some embodiments, after entering a pre-scanning state in 3D contrast-enhance imaging, that is, a bounding box marking ROI may appear on each image, and the position and size of the bounding box marking ROI, as well as the swing angle or sliding distance of the bounding box marking ROI, can be adjusted and determined through a trackball and a button or a knob on the device panel. It should be noted that the display parts in FIG. 4, such as the contrast-enhanced unit 401, a timer unit 404, a backward storage unit 403, the 3D contrast-enhanced unit 402, the conventional-velocity element 402*a* and the high-velocity element 402*b*, can be implemented as virtual keys, menus, lists, check boxes and the like on the interface of a touch screen, as long as they can be presented on the interface and interacted with operations by a user, which will not be repeated here. For example, by pressing a corresponding virtual key, clicking a corresponding list, or checking a corresponding check box, etc., the user's selection and input may be implemented, which will not be repeated here.

As shown in FIG. 4, 3D CEUS data generally may be stored in a backward storage mode. Correspondingly, the backward storage may be enabled after the backward storage unit 403 is triggered by the user, and/or the state of the backward storage unit 403 can show whether the backward storage is enabled. After entering the 3D contrast-enhanced imaging mode and starting data acquisition, a certain dose of the prepared contrast agent can be injected into the target, a timer can be opened at the same time (e.g. the timer unit 404 is pressed), and the backward storage is enabled.

Figure 5:
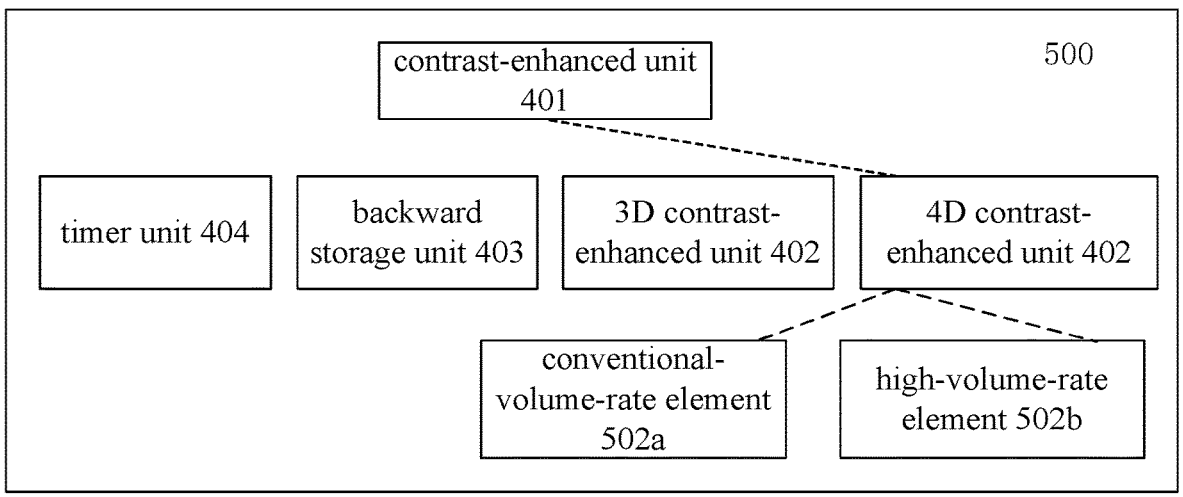
FIG. 5 is a schematic interface of a 3D/4D CEUS imaging apparatus under the 4D contrast-enhanced imaging mode according to an embodiment of the present disclosure.

FIG. 5 schematically shows an interface under the 4D contrast-enhanced imaging mode of a 3D/4D CEUS imaging apparatus according to an embodiment of the present disclosure. Under the 4D contrast-enhanced imaging mode regarded as continuous 3D contrast-enhanced imaging, 3D contrast-enhanced images may be continuously acquired, processed and generated to be refreshed and displayed. After the lesion to be observed is selected by the user, a third interface part 500 configured for the 4D contrast-enhanced imaging mode may be presented by using the device panel or the touch-screen button. As shown in FIG. 5, in addition to the display of the first interface part 400, the third interface part 500 may include display parts configured for interacting with the user under the 4D contrast-enhanced imaging mode, including but not limited to a 4D contrast-enhanced unit 502, a conventional-volume-rate element 502*a* and a high-volume-rate element 502*b*. To simplify the specification, the details of the display parts that have been described in connection with FIG. 4 will not be repeated herein. With the presentation of the third interface part 500 configured for the 4D contrast-enhanced imaging mode, a third input configured for choosing the 4D contrast-enhanced imaging mode is received in response to a third interactive operation by a user on the third interface part 500, such as selecting the 4D contrast-enhanced unit 502 which belongs to the contrast-enhanced unit 401, thereby enabling the 4D contrast-enhanced mode. A fourth interface part on which the first and second imaging velocities may be presented in association with the 4D contrast-enhanced imaging mode, such as the conventional-volume-rate element 502*a* and the high-volume-rate element 502*b* shown in FIG. 5. It should be noted that under the 4D contrast-enhanced imaging mode, the "high volume rate" and the "conventional volume rate" are examples of the "second imaging velocity" and the "first imaging velocity" respectively in the present disclosure, but a plurality of different imaging velocities may also be set. A fourth input for selecting the first imaging velocity or the second imaging velocity may be received in response to a fourth interactive operation by a user on the fourth interface part (such as selecting the conventional-volume-rate element 502*a* or the high-volume-rate element 502*b*), wherein the second imaging velocity is higher than the first imaging velocity.

After starting the 4D contrast-enhanced imaging mode and entering a pre-scanning state in the 4D contrast-enhanced imaging, that is, a bounding box marking ROI may appear on each image, and the position and size of the bounding box marking ROI, as well as the swing angle or sliding distance of the bounding box marking ROI, can be adjusted and determined through the trackball and the button or the knob on the device panel. Two imaging volume rates—the conventional volume rate and the high volume rate, are provided after entering the 4D contrast-enhanced imaging mode. The difference between these two velocities is that the latter is faster than the former when acquiring and rendering the same range of volume data. For example, the volume rate of the volume probe is 1.0 VPS when performing the 4D contrast-enhanced imaging with the conventional volume rate, while the volume rate may be 2.0 VPS when performing the 4D contrast-enhanced imaging with the high volume rate. It should be noted that the display parts in FIG. 5 can be implemented as virtual keys, menus, lists, check boxes and the like on the interface of the touch screen, as long as they can be presented on the interface and interacted with operations by a user, which will not be repeated here. For example, the user's selection and input may be implemented by pressing a corresponding virtual key, clicking a corresponding list, or checking a corresponding check box, etc., which will not be repeated here.

Figure 6:
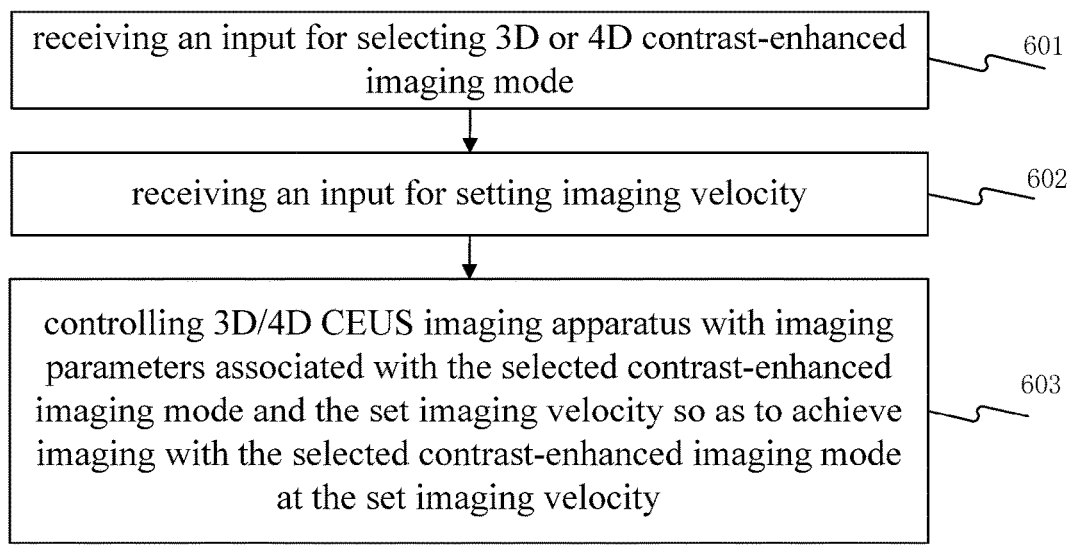
FIG. 6 is a schematic diagram for an Example 2 of a 3D/4D CEUS imaging method according to an embodiment of the present disclosure.

FIG. 6 schematically shows an Example 2 of a 3D/4D CEUS imaging method according to an embodiment of the present disclosure. This method is applicable to a 3D/4D CEUS imaging apparatus equipped with various probes. As shown in FIG. 6, the method may include receiving an input for selecting the 3D contrast-enhanced imaging mode or the 4D contrast-enhanced imaging mode (step 601). An input for setting the imaging velocity may be received in step 602. Then, in step 603, the 3D/4D CEUS imaging apparatus may be controlled with imaging parameters associated with the selected contrast-enhanced imaging mode and the set imaging velocity so as to achieve imaging under the selected contrast-enhanced imaging mode at the set imaging velocity. That is to say, according to the selected contrast-enhanced imaging mode and the set imaging velocity, the imaging parameters can be adjusted accordingly or the associated imaging parameters can be called up, wherein the imaging parameters may include at least one of items that are required to generate one volume of data: the number of transmissions, line density and/or the number of data on each line, pulse repetition rate and the range of ROI.

The selection of the 3D CEUS imaging mode or the 4D CEUS imaging mode, as well as the setting of the imaging velocity, can be realized by allowing the user to interact with the interface in various ways. For example, the first interface part involving the 3D contrast-enhanced imaging mode may be presented, and the first input configured for choosing the 3D contrast-enhance imaging mode may be received in response to the first interactive operation by the user on the first interface part; and the second interface part involving the first imaging velocity and the second imaging velocity may be presented in association with the 3D contrast-enhanced imaging mode, and the second input configured for choosing the first imaging velocity or the second imaging velocity may be received in response to the second interactive operation by the user on the second interface part, wherein the second imaging velocity is higher than the first imaging velocity. As another example, the third interface part involving the 4D contrast-enhanced imaging mode may be presented, and the third input configured for choosing the 4D contrast-enhance imaging mode may be received in response to the third interactive operation by the user on the third interface part; and the fourth interface part involving the first imaging velocity and the second imaging velocity may be presented in association with the 3D contrast-enhanced imaging mode, and the fourth input configured for choosing the first imaging velocity or the second imaging velocity may be received in response to the fourth interactive operation by the user on the fourth interface part, wherein the second imaging velocity is higher than the first imaging velocity.

In some embodiments, the imaging parameters can be associated with the selected contrast-enhanced imaging mode and the set imaging velocity through at least one of the following manners. Various imaging parameters may be adjusted in association with the selected contrast-enhanced imaging mode and the set imaging velocity during every step of the 3D/4D contrast-enhanced imaging, including a transmitting and controlling step, a receiving and controlling step and an ROI setting step.

At least one of the wide-beam transmission mode, the plane-wave transmission mode and the coherent-combination transmission mode may be adopted when setting the imaging velocity as the second imaging velocity. A focused-wave line-by-line transmission mode, or at least one of the wide-beam transmission mode, the plane-wave transmission mode and the coherent-combination transmission mode may be adopted when setting the imaging velocity as the first imaging velocity, but at the same time, compared with that when setting the imaging velocity as the second imaging velocity, the number of transmissions required for each volume of data may be reduced when setting the imaging velocity as the first imaging velocity so as to improve imaging velocity. This may involve adaptation and/or adjustment to the imaging parameters during the transmitting and controlling step.

As compared with those when setting the imaging velocity as the first imaging velocity, the line density and/or the number of data on each line that are required for generating one volume of data can be reduced when setting the imaging velocity as the second imaging velocity so as to improve imaging velocity. This may involve adaptation and/or adjustment to the imaging parameters during the receiving and controlling step.

As compared with that when setting the imaging velocity as the first imaging velocity, the PRF may be increased when setting the imaging velocity as the second imaging velocity so as to improve imaging velocity.

The range of ROI may be set when setting the imaging velocity as the second imaging velocity, while it may not need to set the range of ROI when setting the imaging velocity as the first imaging velocity. Alternatively, compared with that when setting the imaging velocity as the first imaging velocity, the range of ROI may be decreased when setting the imaging velocity as the second imaging velocity. This may involve adaptation and/or adjustment to the imaging parameters during the ROI setting step. The setting or reduction of the ROI range can further decrease the amount of volume data, so as to improve the imaging velocity.

With the simple association mentioned above, the imaging parameters involved in each existing step can be easily correlated with the selected contrast-enhanced imaging mode and the set imaging velocity, making the whole process compatible with the existing 3D/4D contrast-enhanced imaging method without introducing a new processing step, thus improving the operation friendliness, feasibility and reliability, simplifying the workflow, and reducing the implementation cost.

In some embodiments, for a target having hypervascularity that is at a centimeter level or below, with the coordination and adjustment of various imaging parameters mentioned above, the second imaging velocity can be faster than a first threshold under the 3D contrast-enhanced imaging mode, and the second imaging velocity can be faster than a second threshold under the 4D contrast-enhanced imaging mode. The first and second thresholds can be customized according to specific needs of doctors when they view CEUS results of a small-sized blood-supplied target in real time, so as to ensure that doctors can capture the complete perfusion process of microbubbles, and further give reliable diagnostic results.

Where the imaging parameters are associated with the selected contrast-enhanced imaging mode and the set imaging velocity, the priority and correlation of the various imaging parameters may also be considered. In some embodiments, the number of transmission required for one volume of data is prioritized over the range of ROI. In other words, priority should be given to changing the number of transmissions required for one volume of data, so as to reduce the impact on user perception, and the imaging velocity can be improved by reducing the number of transmissions required for each volume of data as much as possible in an allowable range until it can not be improved further; and in this respect, the imaging velocity may be improved by considering in addition changing the range of ROI to avoid the loss of the physical field of view caused by the change of the ROI range.

In some embodiments, where both the range of ROI and the PRF are changed, the PRF is changed in association with a depth corresponding to the range of ROI. Specifically, the depth corresponding to the range of ROI has a limiting effect on the PRF, and the adjustment of the PRF may not exceed a depth limit. When the requirement for the depth are met, the PRF can be adjusted towards the goal of increasing imaging velocity.

In the present disclosure, the probe may include at least one of an ultrasonic volume probe, a planar array probe, and a conventional ultrasonic array probe. In some embodiments, the 3D/4D CEUS imaging method may further include detecting the type of probe connected; and allowing the configuration of the imaging parameters to be corresponded to the detected type of probe, respective configuration defining the imaging parameters of corresponding probe type that are associated with respective contrast-enhanced imaging mode and respective imaging velocity. Thus, the doctors can freely switch connected probes based on actual needs. Accordingly, this method can respond to the switching of the probes by the doctors to select an appropriate imaging velocity and its appropriate adjustment in accordance with unique imaging conditions of various types of probes, so as to ensure that the imaging velocity for CEUS expected by the doctors can be maintained while the probes are switched.

Figure 7A:
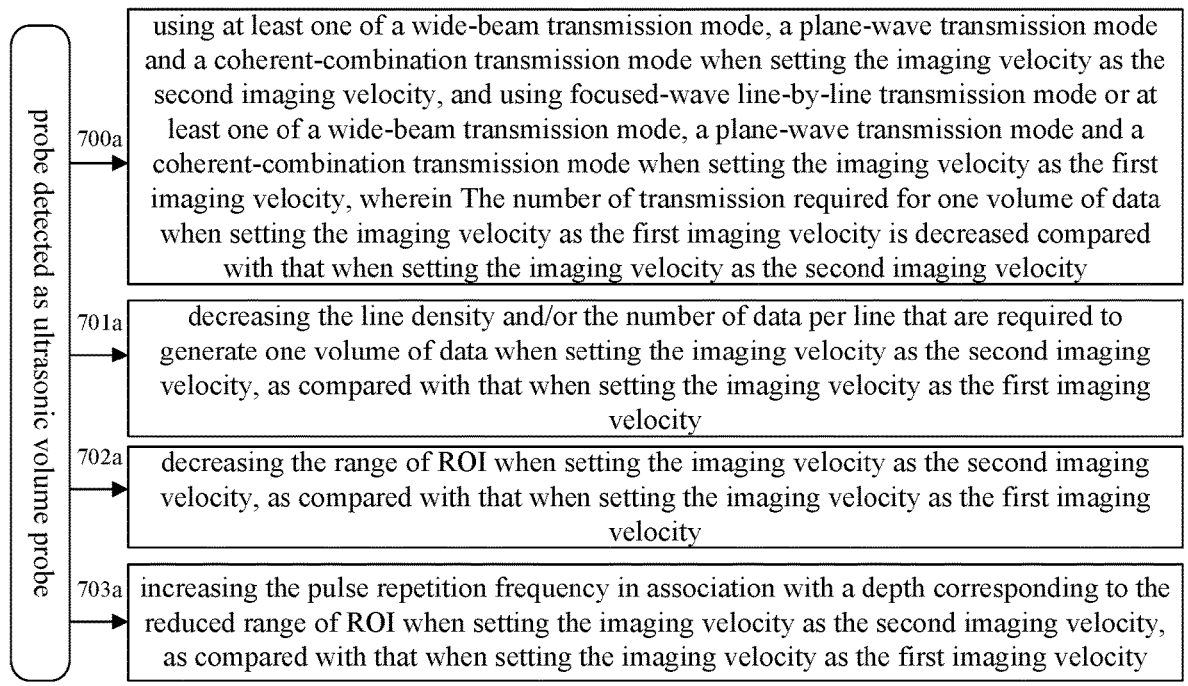
FIG. 7($a$) is a schematic configuration of imaging parameters used in a 3D/4D CEUS imaging method where a probe is an ultrasonic volume probe according to an embodiment of the present disclosure.
Figure 7B:
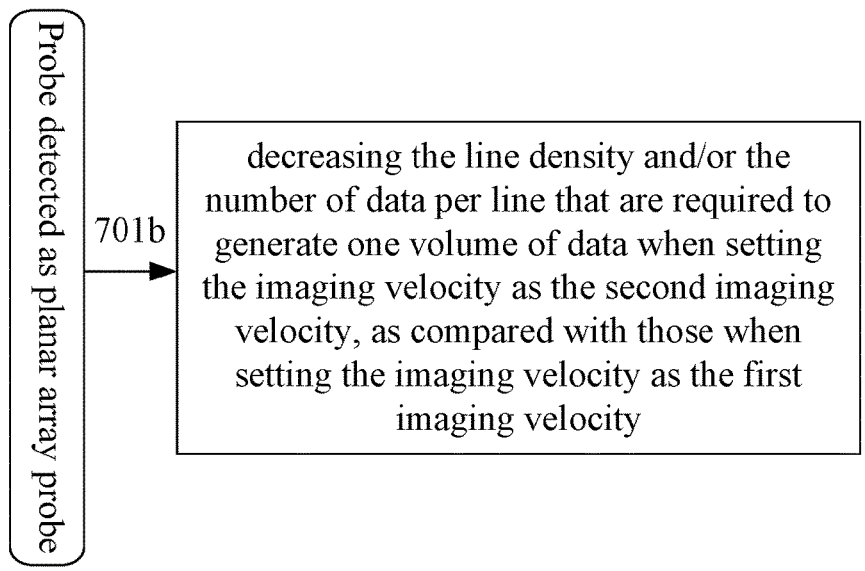
Figure 7C:
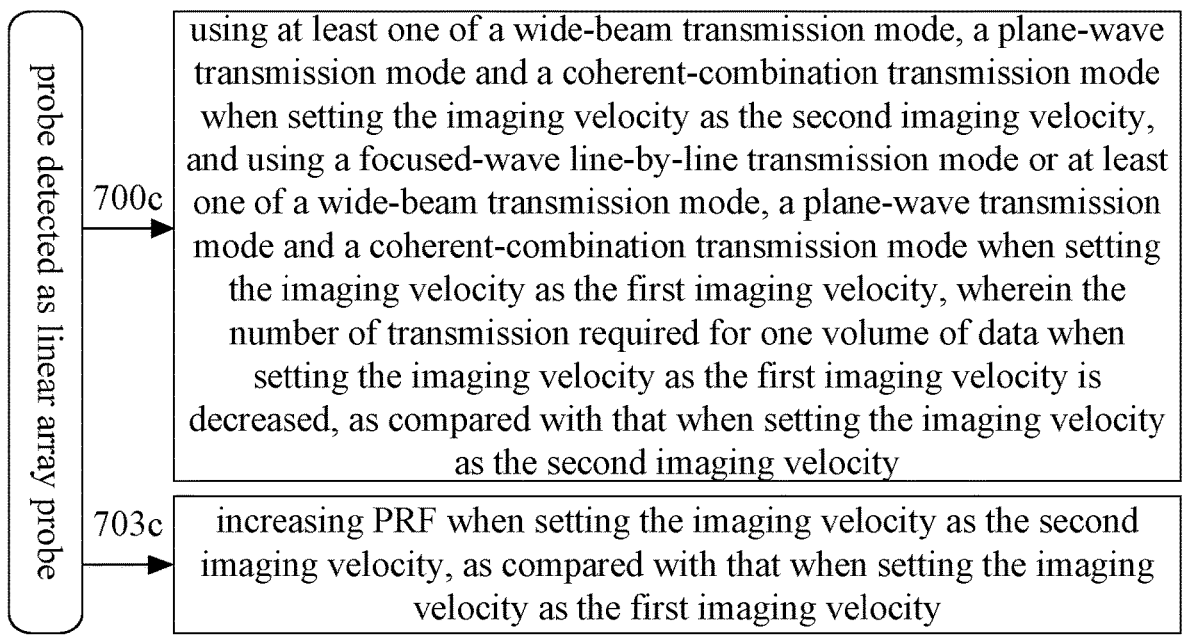

FIG. 7(a) schematically shows a configuration of imaging parameters of a 3D/4D CEUS imaging method according to an embodiment of the present disclosure where the probe is an ultrasonic volume probe. In this example, the first imaging velocity is lower than the second imaging velocity.

Where the detected type of probe is an ultrasonic volume probe, one or more of steps 700a, 701a, 702a, and 703a may be employed to determine imaging parameters associated with imaging velocity. Specifically, when the imaging velocity is changed, the processor can dynamically change and adapt the imaging parameters in association therewith so as to meet the requirements of real-time detection in the application scenarios expected by doctors.

In step 700*a*, at least one of the wide-beam transmission mode, the plane-wave transmission mode and the coherent-combination transmission mode may be adopted when setting the imaging velocity as the second imaging velocity; and the focused-wave line-by-line transmission mode or at least one of the wide-beam transmission mode, the plane-wave transmission mode and the coherent-combination transmission mode may be adopted when setting the imaging velocity as the first imaging velocity but at the same time the number of transmission required for one volume of data is decreased when setting the imaging velocity as the first imaging velocity compared with that when setting the imaging velocity as the second imaging velocity. Usually, step 700*a* is a prioritized processing step for increasing the imaging velocity. Typically, the 3D/4D CEUS imaging apparatus using ultrasound volume probes rely on step 700*a* to increase imaging velocity.

In step 701*a*: the line density and/or the number of data on each line that are required for generating one volume of data can be decreased when setting the imaging velocity as the second imaging velocity, as compared with those when setting the imaging velocity as the first imaging velocity.

In step 702*a*: the range of ROI may be decreased when setting the imaging velocity as the second imaging velocity, as compared with that when setting the imaging velocity as the first imaging velocity.

In step 703*a*: the PRF may be increased in association with a depth corresponding to the decreased ROI range when setting the imaging velocity as the second imaging velocity, as compared with that when setting the imaging velocity as the first imaging velocity.

Steps 701*a* to 703*a* are compatible with existing processing steps of 3D/4D CEUS imaging apparatus using ultrasound volume probes. Specifically, the existing processing may also need to set the line density and/or the number of data on each line that are required to generate one volume of data, as long as such existing processing is performed in a decreasing manner, step 701*a* can be implemented in a low-cost and high-friendliness manner; and the existing processing may also need to set the PRF, as long as such existing processing is performed in a way that the depth corresponding to the decreased the range of ROI is increased relatively, step 703*a* can be implemented in a low-cost and high-friendliness manner. Further, the range of ROI may generally need to be set in the existing process, and step 702*a* can be implemented in a low-cost and high-friendliness manner as long as such existing processing is performed in a decreasing manner. Further, by increasing the PRF in association with the corresponding depth of the reduced ROI range when setting the imaging velocity as the second imaging velocity, as compared to that when setting the imaging velocity as the first imaging velocity, the PRF is adjusted on the premise that the requirement of depth is met so that the PRF matches the corresponding depth of the reduced ROI range, ensuring good image quality within the reduced ROI range, especially at its depth limit.

FIG. 7(*b*) schematically shows a configuration of the imaging parameters of the 3D/4D CEUS imaging method according to an embodiment of the present disclosure when the probe is a planar array probe. The configuration of imaging parameters when the probe is detected as a planar array probe is described in detail above with reference to FIG. 3. FIG. 7(*b*) is another simplified example. As shown in FIG. 7(*b*), when the probe detected is a planar array probe, the imaging velocity associated with the imaging velocity may be determined mainly by using step 701*b*. Specifically, the line density and/or the number of data per line required to generate one volume of data is reduced when setting the imaging velocity as the second imaging velocity, as compared with those when setting the imaging velocity as the first imaging velocity. As a result, the amount of data required to generate each volume of images can be significantly reduced, thereby achieving the purpose of increasing the imaging velocity.

Unlike other types of probes, planar array probes are more expensive and have higher requirements on hardware in acquisition, storage and processing. When performing 3D/4D CEUS imaging, step 701*b* can effectively solve the problem of insufficient computing resources it faces when it is compatible with existing hardware. Generally, where the probe is a planar array probe, the acquisition speed is faster through electronic scanning, and there is no need to set the range of ROI; accordingly, with step 701*b* that is used to efficiently solve the problem of insufficient computing resources, it is not necessary to perform setting the range of ROI or reducing the range of ROI so as to avoid the loss of physical field of view. Further, where the probe is a planar array probe, the transmission mode of the planar array probe may also generally be adjusted without considering different imaging velocities, that is, the transmission mode of the planar array probe to transmit ultrasonic waves to the target can be maintained regardless of the change of the imaging velocity, because this adjustment will increase costs on hardware and control but with insignificant improvement of imaging velocity.

In some embodiments, the PRF can be increased when setting the imaging velocity as the second imaging velocity, as compared with that when setting the imaging velocity as the first imaging velocity. By making the amount of data required to generate each volume of images using the first imaging velocity greater than the amount of data required to generate each volume of images using the second imaging velocity, coordinating with the increasing of the PRF, the imaging velocity can be further improved.

FIG. 7(*c*) schematically shows a configuration of the imaging parameters of the 3D/4D CEUS imaging method according to an embodiment of the present disclosure when the probe is a linear array probe. When the probe detected is a linear array probe, one or more of steps 700*c* and 703*c* can be performed to determine the imaging parameters associated with the imaging velocity.

In step 700*c*, at least one of the wide-beam transmission mode, the plane-wave transmission mode and the coherent-combination transmission mode may be adopted when setting the imaging velocity as the second imaging velocity; and the focused-wave line-by-line transmission mode or at least one of the wide-beam transmission mode, the plane-wave transmission mode and the coherent-combination transmission mode may be adopted when setting the imaging velocity as the first imaging velocity in which the number of transmission required for each volume of data may be reduced compared with the setting of the second imaging velocity.

In step 703*c*, the PRF is increased when setting the imaging velocity as the second imaging velocity, as compared with that when setting the imaging velocity as the first imaging velocity.

When the probe detected is a linear array probe, the ROI can be neither set nor adjusted, so as to solve a problem caused by the shallow imaging depth of the linear array probe, that is: the adjustment of ROI is not practical, instead the ROI adjustment is easy to be excessive, which may affect the quality of observed images. For linear probes, step 700c and step 703c are the most effective and practical means to improve the imaging velocity. Further, the limitation on the PRF is very small due to the shallow imaging depth, so using step 703c can increase the PRF in a larger adjustable range, thereby further improving the imaging velocity.

Figure 7D:
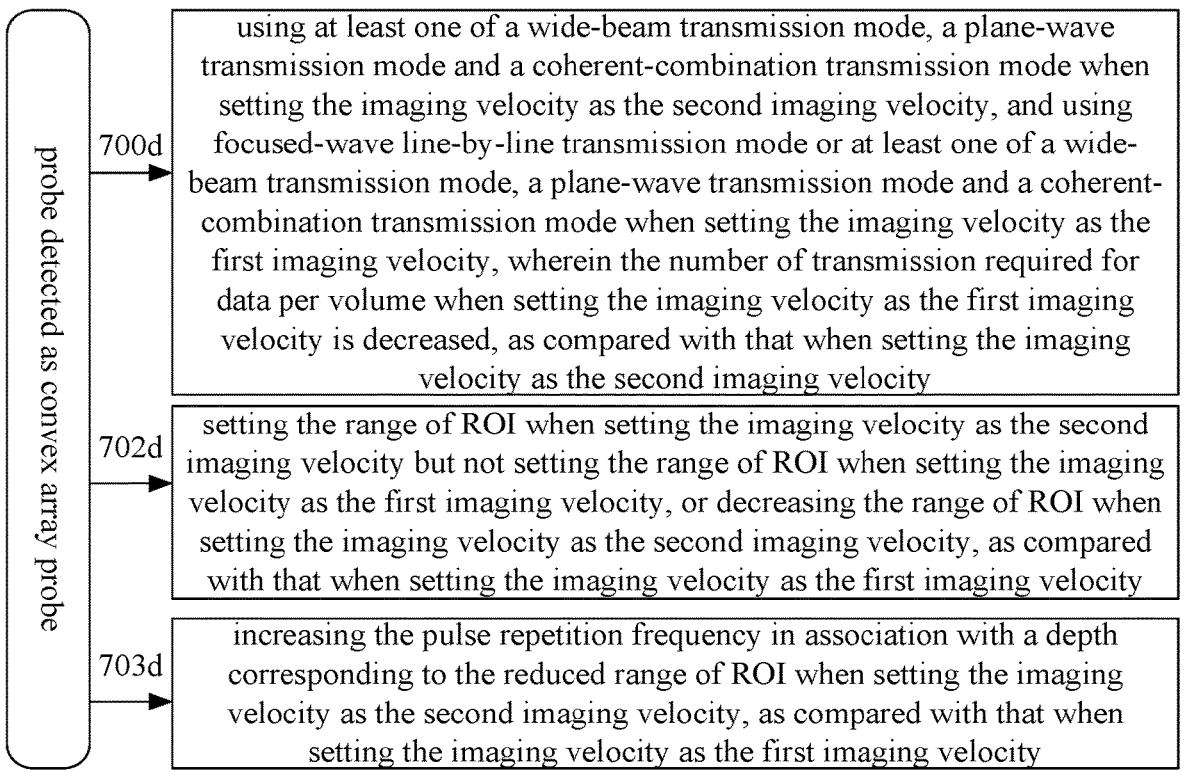

FIG. 7(d) schematically shows a configuration of imaging parameters of a 3D/4D CEUS imaging method according to an embodiment of the present disclosure when the probe is a convex array probe.

When the probe detected is a convex array probe, one or more of steps 700d, 702d, and 703d can be used to determine the imaging parameters associated with the imaging velocity.

In step 700d, at least one of the wide-beam transmission mode, the plane-wave transmission mode and the coherent-combination transmission mode may be adopted when setting the imaging velocity as the second imaging velocity; and the focused-wave line-by-line transmission mode or at least one of the wide-beam transmission mode, the plane-wave transmission mode and the coherent-combination transmission mode may be adopted when setting the imaging velocity as the first imaging velocity in which the number of transmission required for each volume of data may be reduced compared with the setting of the second imaging velocity.

In step 702d, the ROI is set when setting the imaging velocity as the second imaging velocity but not set when setting the imaging velocity as the first imaging velocity; or the range of ROI is decreased when setting the imaging velocity as the second imaging velocity, as compared with that when setting the imaging velocity as the first imaging velocity.

In step 703d, the PRF is increased in association with a depth corresponding to the range of ROI when setting the imaging velocity as the second imaging velocity, compared with setting the imaging velocity as the first imaging velocity.

As shown above, when the probe detected is a convex array probe, the setting and adjusting of the ROI range may be adopted. Generally, the imaging depth of the convex array probe is relatively deeper. By introducing a shallower ROI range in the depth range, the limitation on PRF can be reduced, so that the PRF can be increased in a larger adjustable range, so as to further improve the imaging velocity.

The present disclosure also provides a computer-readable storage medium having computer-executable instructions stored thereon. Part or all of the steps of the 3D/4D CEUS imaging method according to various embodiments of the present disclosure, which can be implemented as a computer program, can be realized when the computer-executable instructions are executed by the processor. The above-described program can be stored in various types of non-transitory computer-readable media and can be provided to a computer. Non-transitory computer-readable media may include various types of tangible storage media. Examples of non-transitory computer-readable media may include magnetic recording media (e.g. floppy disks, magnetic tapes, and hard disk drives), magneto-optical recording media (e.g. magneto-optical disks), read only memory (CD-ROM), CD-R, CD-R/W, semiconductor memory (e.g. mask ROM, programmable ROM (PROM), erasable PROM (EPROM), flash ROM, and random access memory (RAM)). The program may be provided to the computer via various types of temporary computer-readable media. Examples of temporary computer-readable media may include electrical signals, optical signals, and electromagnetic waves. The transitory computer-readable media can provide the program to a computer via wired communication (such as wires and optical fibers) or wireless communication.

The present invention is not limited to the above-mentioned embodiments and can be modified as necessary without departing from the scope of the present invention.

The invention claimed is:

1. A 3D/4D contrast-enhanced ultrasound imaging apparatus, comprising: a probe, a transmitting circuit configured to excite the probe to transmit ultrasonic waves to a target, a receiving circuit configured to control the probe to receive ultrasonic echo signals returned from the target, and a processor; wherein the processor is configured for:

receiving an input for selecting a 3D contrast-enhanced imaging mode or a 4D contrast-enhanced imaging mode;

entering the 3D contrast-enhanced imaging mode or the 4D contrast-enhanced imaging mode based on the input;

receiving an input for setting an imaging velocity associated with the selected 3D contrast-enhanced imaging mode or 4D contrast-enhanced imaging mode under the selected 3D contrast-enhanced imaging mode or 4D contrast-enhanced imaging mode, wherein the set imaging velocity comprises a first imaging velocity and a second imaging velocity higher than the first imaging velocity; and controlling the 3D/4D contrast-enhanced ultrasound imaging apparatus with an imaging parameter associated with the selected 3D contrast-enhanced imaging mode or 4D contrast-enhanced imaging mode and the set imaging velocity, so as to realize imaging at the set imaging velocity under the selected 3D contrast-enhanced imaging mode or 4D contrast-enhanced imaging mode, the imaging parameter including at least one of items required to generate one volume of data, wherein the imaging parameter comprises:

a number of transmissions and a range of region of interest (ROI), or a number of transmissions and a range of region of interest (ROI), and the at least one of items comprising: line density, a number of data per line, and a pulse repetition frequency;

wherein the number of transmissions required for one volume of data is prioritized over the range of ROI, and the pulse repetition frequency is changed in association with a depth corresponding to the range of ROI when changing both the range of ROI and the pulse repetition frequency.

2. The 3D/4D contrast-enhanced ultrasound imaging apparatus according to claim 1, wherein the imaging parameter is associated with the selected 3D contrast-enhanced imaging mode or 4D contrast-enhanced imaging mode and the set imaging velocity by at least one of the following:

using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, wherein the number of transmissions required for one volume of data when setting the imaging velocity as the second imaging velocity is decreased, as compared with that when setting the imaging velocity as the first imaging velocity;

decreasing the line density and/or the number of data per line that are required to generate one volume of data when setting the imaging velocity as the second imaging velocity, as compared with those when setting the imaging velocity as the first imaging velocity;

increasing the pulse repetition frequency when setting the imaging velocity as the second imaging velocity, as compared with that when setting the imaging velocity as the first imaging velocity; and setting the range of ROI when setting the imaging velocity as the second imaging velocity but not setting the range of ROI when setting the imaging velocity as the first imaging velocity, or decreasing the range of ROI when setting the imaging velocity as the second imaging velocity, as compared with that when setting the imaging velocity as the first imaging velocity.

3. The 3D/4D contrast-enhanced ultrasound imaging apparatus according to claim 1, wherein for the target having hypervascularity that is at a centimeter level or below, the second imaging velocity is faster than a first threshold under the 3D contrast-enhanced imaging mode, and the second imaging velocity is faster than a second threshold under the 4D contrast-enhanced imaging mode.

4. The 3D/4D contrast-enhanced ultrasound imaging apparatus according to claim 1, wherein the probe comprises at least one of an ultrasonic volume probe, a planar array probe, a linear array probe, and a convex array probe; and the processor is further configured for: detecting a type of the probe connected, and allowing the imaging parameter to adopt a configuration corresponding to the detected type of the probe connected, each configuration defining the imaging parameter associated with respective contrast-enhanced imaging mode and respective imaging velocity under a corresponding probe type.

5. The 3D/4D contrast-enhanced ultrasound imaging apparatus according to claim 4, wherein the processor is further configured for: when the probe is the ultrasonic volume probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, wherein the number of transmissions required for one volume of data when setting the imaging velocity as the second imaging velocity is decreased, as compared with that when setting the imaging velocity as the first imaging velocity;

decreasing the line density and/or the number of data per line that are required to generate one volume of data when setting the imaging velocity as the second imaging velocity, as compared with those when setting the imaging velocity as the first imaging velocity;

decreasing the range of ROI when setting the imaging velocity as the second imaging velocity, as compared with that when setting the imaging velocity as the first imaging velocity; and increasing the pulse repetition frequency in association with a depth corresponding to the decreased range of ROI when setting the imaging velocity as the second imaging velocity, as compared with that when setting the imaging velocity as the first imaging velocity.

6. The 3D/4D contrast-enhanced ultrasound imaging apparatus according to claim 4, wherein the processor is further configured for: when the probe is the planar array probe, decreasing the line density and/or the number of data per line that are required to generate one volume of data when setting the imaging velocity as the second imaging velocity, as compared with those when setting the imaging velocity as the first imaging velocity.

7. The 3D/4D contrast-enhanced ultrasound imaging apparatus according to claim 4, wherein the processor is further configured for: when the probe is the linear array probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, wherein the number of transmissions required for one volume of data when setting the imaging velocity as the second imaging velocity is decreased, as compared with that when setting the imaging velocity as the first imaging velocity; and increasing the pulse repetition frequency when setting the imaging velocity as the second imaging velocity, as compared with that when setting the imaging velocity as the first imaging velocity.

8. The 3D/4D contrast-enhanced ultrasound imaging apparatus according to claim 4, wherein the processor is further configured for: when the probe is the convex array probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, the number of transmissions required for one volume of data when setting the imaging velocity as the second imaging velocity being decreased, as compared with that when setting the imaging velocity as the first imaging velocity;

setting the range of ROI when setting the imaging velocity as the second imaging velocity but not setting the range of ROI when setting the imaging velocity as the first imaging velocity, or decreasing the range of ROI when setting the imaging velocity as the second imaging velocity, as compared with that when setting the imaging velocity as the first imaging velocity; and increasing the pulse repetition frequency in association with a depth corresponding to the decreased range of ROI when setting the imaging velocity as the second imaging velocity, as compared with that when setting the imaging velocity as the first imaging velocity.

9. A 3D/4D contrast-enhanced ultrasound image method, which is used in a 3D/4D contrast-enhanced ultrasound imaging apparatus comprising a planar array probe, a transmitting circuit configured to excite the planar array probe to transmit ultrasonic waves to a target, a receiving circuit configured to control the planar array probe to receive ultrasonic echo signals returned from the target, and a processor, comprising: by the processor, receiving an input for selecting a 3D contrast-enhanced imaging mode or a 4D contrast-enhanced imaging mode;

entering the 3D contrast-enhanced imaging mode or the 4D contrast-enhanced imaging mode based on the input;

receiving an input for setting an imaging velocity associated with the selected 3D contrast-enhanced imaging mode or 4D contrast-enhanced imaging mode under the selected 3D contrast-enhanced imaging mode or 4D contrast-enhanced imaging mode, the set imaging velocity comprising a first imaging velocity and a second imaging velocity, the first imaging velocity being lower than the second imaging velocity; and controlling the 3D/4D contrast-enhanced ultrasound imaging apparatus with an imaging parameter associated with the selected 3D contrast-enhanced imaging mode or 4D contrast-enhanced imaging mode and the set imaging velocity, so as to realize imaging at the set imaging velocity under the selected 3D contrast-enhanced imaging mode or 4D contrast-enhanced imaging mode; an association between the imaging parameter and the imaging velocity allowing that an amount of data required to generate images per volume using the first imaging velocity is greater than an amount of data required to generate images per volume using the second imaging velocity, and the imaging parameter including at least one of items required to generate one volume of data, wherein the imaging parameter comprises:

a number of transmissions and a range of region of interest (ROI), or a number of transmissions and a range of region of interest (ROI), and the at least one of items comprising: line density, a number of data per line, and a pulse repetition frequency;

wherein the number of transmission required for one volume of data is prioritized over the range of ROI, and the pulse repetition frequency is changed in association with a depth corresponding to the range of ROI when changing both the range of ROI and the pulse repetition frequency.

10. The 3D/4D contrast-enhanced ultrasound imaging method according to claim 9, wherein prior to controlling the 3D/4D contrast-enhanced ultrasound imaging apparatus with the imaging parameter associated with the selected 3D contrast-enhanced imaging mode or 4D contrast-enhanced imaging mode and the set imaging velocity, by the processor:

receiving an input for setting the pulse repetition frequency, the pulse repetition frequency corresponding to the first imaging velocity being lower than the pulse repetition frequency corresponding to the second imaging velocity.

11. A 3D/4D contrast-enhanced ultrasound imaging method, which is used in a 3D/4D contrast-enhanced ultrasound imaging apparatus comprising a probe, a transmitting circuit configured to excite the probe to transmit ultrasonic waves to a target, a receiving circuit configured to control the probe to receive ultrasonic echo signals returned from the target, and a processor, comprising: by the processor, receiving an input for selecting a 3D contrast-enhanced imaging mode or a 4D contrast-enhanced imaging mode;

entering the 3D contrast-enhanced imaging mode or the 4D contrast-enhanced imaging mode based on the input;

receiving an input for setting an imaging velocity associated with the selected 3D contrast-enhanced imaging mode or 4D contrast-enhanced imaging mode under the selected 3D contrast-enhanced imaging mode or 4D contrast-enhanced imaging mode, wherein the set imaging velocity comprises a first imaging velocity and a second imaging velocity higher than the first imaging velocity; and controlling the 3D/4D contrast-enhanced ultrasound imaging apparatus with an imaging parameter associated with the selected 3D contrast-enhanced imaging mode or 4D contrast-enhanced imaging mode and the set imaging velocity, so as to realize imaging at the set imaging velocity under the selected 3D contrast-enhanced imaging mode or 4D contrast-enhanced imaging mode, the imaging parameter including at least one of items required to generate one volume of data, wherein the imaging parameter comprises:

a number of transmissions and a range of region of interest (ROI), or a number of transmissions and a range of region of interest (ROI), and the at least one of items comprising: line density, a number of data per line, and a pulse repetition frequency;

wherein the number of transmission required for one volume of data is prioritized over the range of ROI, and the pulse repetition frequency is changed in association with a depth corresponding to the range of ROI when changing both the range of ROI and the pulse repetition frequency.

12. The 3D/4D contrast-enhanced ultrasound imaging method according to claim 11, further comprising: by the processor, presenting a first interface part involving the 3D contrast-enhanced imaging mode, and receiving a first input in response to a first interactive operation by a user on the first interface part, the first input being configured to select the 3D contrast-enhanced imaging mode, presenting a second interface part involving the first imaging velocity and the second imaging velocity being in association with the 3D contrast-enhanced imaging mode, and receiving a second input in response to a second interactive operation by the user on the second interface part, the second input being configured to select the first imaging velocity or the second imaging velocity; or presenting a third interface part involving the 4D contrast-enhanced imaging mode, and receiving a third input in response to a third interactive operation by a user on the third interface part, the third input being configured to receive the 4D contrast-enhanced imaging mode, presenting a fourth interface part involving the first imaging velocity and the second imaging velocity being in association with the 4D contrast-enhanced imaging mode, and receiving a fourth input in response to a fourth interactive operation by the user on the fourth interface part, the fourth input being configured to select the first imaging velocity or the second imaging velocity.

13. The 3D/4D contrast-enhanced ultrasound imaging method according to claim 11, wherein the imaging parameter is associated with the selected 3D contrast-enhanced imaging mode or 4D contrast-enhanced imaging mode and the set imaging velocity by at least one of the following:

using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, wherein the number of transmissions required for one volume of data when setting the imaging velocity as the second imaging velocity is decreased, as compared with that when setting the imaging velocity as the first imaging velocity;

decreasing the line density and/or the number of data per line that are required to generate one volume of data when setting the imaging velocity as the second imaging velocity, as compared with those when setting the imaging velocity as the first imaging velocity;

increasing the pulse repetition frequency when setting the imaging velocity as the second imaging velocity, as compared with that when setting the imaging velocity as the first imaging velocity; and setting the range of ROI when setting the imaging velocity as the second imaging velocity but not setting the range of ROI when setting the imaging velocity as the first imaging velocity, or decreasing the range of ROI when setting the imaging velocity as the second imaging velocity, as compared with that when setting the imaging velocity as the first imaging velocity.

14. The 3D/4D contrast-enhanced ultrasound imaging method according to claim 13, wherein the probe comprises at least one of an ultrasonic volume probe, a planar array probe, a linear array probe and a convex array probe; and the 3D/4D contrast-enhanced ultrasound imaging method further comprises: by the processor, detecting a type of the probe connected, and allowing the imaging parameter to adopt a configuration corresponding to the detected type of the probe connected, each configuration defining the imaging parameter associated with respective contrast-enhanced imaging mode and respective imaging velocity under a corresponding probe type.

15. The 3D/4D contrast-enhanced ultrasound imaging method according to claim 14, further comprise: when the probe is the ultrasonic volume probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, the number of transmissions required for one volume of data when setting the imaging velocity as the second imaging velocity being decreased, as compared with that when setting the imaging velocity as the first imaging velocity;

decreasing the line density and/or the number of data per line that are required to generate one volume of data when setting the imaging velocity as the second imaging velocity, as compared with those when setting the imaging velocity as the first imaging velocity;

decreasing the range of ROI when setting the imaging velocity as the second imaging velocity, as compared with that when setting the imaging velocity as the first imaging velocity; and increasing the pulse repetition frequency in association with a depth corresponding to the decreased range of ROI when setting the imaging velocity as the second imaging velocity, as compared with that when setting the imaging velocity as the first imaging velocity.

16. The 3D/4D contrast-enhanced ultrasound imaging method according to claim 14, further comprising: when the probe is the planar array probe, decreasing the line density and/or the number of data per line that are required to generate one volume of data when setting the imaging velocity as the second imaging velocity, as compared with those setting the imaging velocity as the first imaging velocity.

17. The 3D/4D contrast-enhanced ultrasound imaging method according to claim 14, further comprising: when the probe is the linear array probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, the number of transmissions required for one volume of data when setting the imaging velocity as the second imaging velocity being decreased, as compared with that when setting the imaging velocity as the first imaging velocity; and increasing the pulse repetition frequency when setting the imaging velocity as the second imaging velocity, as compared with that when setting the imaging velocity as the first imaging velocity.

18. The 3D/4D contrast-enhanced ultrasound imaging method according to claim 14, further comprising: when the probe is the convex array probe, using at least one of a wide-beam transmission mode, a plane-wave transmission mode and a coherent-combination transmission mode when setting the imaging velocity as the second imaging velocity, and using a focused-wave line-by-line transmission mode or at least one of a wide-beam transmission mode, a plane-wave transmission mode and a coherent-combination transmission mode when setting the imaging velocity as the first imaging velocity, the number of transmissions required for one volume of data when setting the imaging velocity as the second imaging velocity being decreased, as compared with that when setting the imaging velocity as the first imaging velocity;

setting the range of ROI when setting the imaging velocity as the second imaging velocity but not setting the range of ROI when setting the imaging velocity as the first imaging velocity, or decreasing the range of ROI when setting the imaging velocity as the second imaging velocity, as compared with that when setting the imaging velocity as the first imaging velocity; and increasing the pulse repetition frequency in association with a depth corresponding to the decreased range of ROI when setting the imaging velocity as the second imaging velocity, as compared with that when setting the imaging velocity as the first imaging velocity.

* * * * *

UNITED STATES PATENT AND TRADEMARK OFFICE
CERTIFICATE OF CORRECTION

PATENT NO. : 12,478,354 B2  
APPLICATION NO. : 17/971524  
DATED : November 25, 2025  
INVENTOR(S) : Maodong Sang, Lei Zhu and Xujin He Page 1 of 1

It is certified that error appears in the above-identified patent and that said Letters Patent is hereby corrected as shown below:

On the Title Page

(30) Foreign Application Priority Data  
Oct. 26, 2021 (CN) ...............................202111246292.6

Should read:

(30) Foreign Application Priority Data  
Oct. 26, 2021 (CN) ...............................202111246292.3

Signed and Sealed this  
Sixth Day of January, 2026

John A. Squires  
*Director of the United States Patent and Trademark Office*